United States Patent
Bushek (10) Patent No.: US 9,862,298 B2
(45) Date of Patent: Jan. 9, 2018

(54) TRAILER DOVETAIL ACTUATING SYSTEM

(71) Applicant: Big Tex Trailer Manufacturing, Inc., Mount Pleasant, TX (US)

(72) Inventor: Mark Bushek, Cookville, TX (US)

(73) Assignee: BIG TEX TRAILER MANUFACTURING, INC., Mt. Pleasent, TX (US)

( * ) Notice: Subject to any disclaimer, the term of this patent is extended or adjusted under 35 U.S.C. 154(b) by 0 days.

(21) Appl. No.: 15/231,184

(22) Filed: Aug. 8, 2016

(65) Prior Publication Data
US 2017/0066360 A1 Mar. 9, 2017

Related U.S. Application Data

(60) Provisional application No. 62/214,087, filed on Sep. 3, 2015.

(51) Int. Cl.
*B60P 1/43* (2006.01)
*B60P 3/12* (2006.01)

(52) U.S. Cl.
CPC ............. *B60P 1/433* (2013.01); *B60P 1/43* (2013.01); *B60P 3/122* (2013.01)

(58) Field of Classification Search
CPC ............. B60P 1/43; B60P 1/433; B60P 3/122
See application file for complete search history.

(56) References Cited

U.S. PATENT DOCUMENTS

| | | | | |
|---|---|---|---|---|
| 4,516,902 A * | 5/1985 | Matson | ................... | B60P 1/433 414/480 |
| 5,094,583 A * | 3/1992 | Bills, Jr. | ................. | B60P 1/433 298/17 B |
| 5,215,426 A * | 6/1993 | Bills, Jr. | ................... | B60P 1/43 414/537 |
| 6,394,734 B1 * | 5/2002 | Landoll | .................. | B60P 1/433 280/149.2 |
| 8,555,443 B2 * | 10/2013 | Couto | .................... | A61G 3/061 14/69.5 |
| 8,794,859 B1 * | 8/2014 | Patterson | ................ | B29C 49/78 403/102 |
| 9,387,789 B2 | 7/2016 | Patterson | | |
| 9,493,103 B2 * | 11/2016 | Engelken | ................ | B60P 1/433 |
| 9,656,588 B2 * | 5/2017 | Robertson | ............... | B60P 1/433 |
| 2016/0096464 A1 * | 4/2016 | Robertson | ................ | B60P 3/06 414/480 |

* cited by examiner

*Primary Examiner* — Kaitlin S Joerger
(74) *Attorney, Agent, or Firm* — Hovey Williams LLP (57) ABSTRACT

A trailer comprising a main portion and a dovetail connected to a rear end of the main portion. The dovetail being configured to actuate between a travel position and a load position. The trailer additionally comprises a sled secured to the main portion and configured to actuate between a retracted position and an extended position. The trailer further comprises an actuator for extending and retracting the sled. With the sled in the extended position, the actuator and the sled is configured to maintain the dovetail in the travel position without the use of secondary locking mechanisms.

20 Claims, 10 Drawing Sheets

TRAILER DOVETAIL ACTUATING SYSTEM

CROSS-REFERENCE TO RELATED APPLICATION

This non-provisional patent application claims priority to U.S. Provisional Patent Application Ser. No. 62/214,087, filed on Sep. 3, 2015, entitled "TRAILER DOVETAIL ACTUATING SYSTEM," the entirety of which is incorporated by reference into the present non-provisional patent application.

BACKGROUND OF THE INVENTION

1. Field of the Invention

The present invention relates generally to a system and method for actuating a trailer dovetail. In more detail, embodiments of the present invention are directed to a hydraulic system for selectively actuating a trailer dovetail between a load position and a travel position and for securely maintaining the dovetail in the travel position.

2. Description of the Related Art

Flatbed-type trailers are often used to haul large cargo items including vehicles and other heavy-equipment. Such trailers are commonly pulled by trucks or tractors, which provide the locomotion for the trailer and the cargo. For instance, a front end of such trailers may include a hitch assembly (e.g., a gooseneck) configured to be connected to the trucks or tractors, such that the trucks or tractors can pull the trailers and their cargo.

To facilitate the ability to load and unload cargo from the trailers, certain flatbed-type trailers have rear ends that include dovetail portions, with such dovetail portions configured to hingedly rotate with respect to a main portion of the trailers. Specifically, a dovetail is generally configured to rotate from a generally horizontal travel position (i.e., coplanar with the main portion of the trailer), to a downwardly-orientated load/unload position (i.e., positioned at an angle with respect to the main portion of the trailer). With the dovetail in the load/unload position (hereinafter the "load position"), cargo can be more easily loaded onto and unloaded from the trailer. For instance, if the cargo is a wheeled vehicle, then the wheeled vehicle can simply be driven from the ground up the dovetail and onto the main portion of the trailer. Once the cargo has been loaded, the dovetail can be transitioned to the travel position, such that the trailer and the cargo can be transported via the truck or tractor pulling the trailer. Once the trailer and the cargo have reached their destination, the dovetail can again be transitioned to the load position, such that the cargo can be unloaded.

Although trailers with dovetails are beneficial for loading and unloading cargo, because of the size and weight of the dovetails, such dovetails are generally difficult to transition between load and travel positions, and vice-versa. Some previously-used trailers have incorporated the use of hydraulic systems to actuate the dovetails. Nevertheless, such systems are often complex and include multiple interacting components, such as a secondary locking mechanism for securing the dovetail in either the load position or the travel position. Furthermore, previously-used systems for actuating dovetails generally require a plurality of moving components that engage each other in a high-friction manner, such that the systems are highly inefficient and prone to wear and tear. As such, there is a need for a trailer dovetail actuating system that is safe and efficient to operate, that is stable during loading, unloading, and cargo hauling, and that does not require additional components to maintain the dovetail in either the load or travel position.

SUMMARY

Embodiments of the present invention include a trailer comprising a main portion and a dovetail connected to a rear end of the main portion. The dovetail being configured to actuate between a travel position and a load position. The trailer additionally comprises a sled secured to the main portion and configured to actuate between a retracted position and an extended position. The trailer further comprises an actuator for extending and retracting the sled. With the sled in the extended position, the actuator and the sled are configured to maintain the dovetail in the travel position without the use of secondary locking mechanisms.

Embodiments of the present invention additionally include a method of raising and lowering a trailer dovetail. The method comprises the initial step of providing a sled that includes a wedge portion. An additional step includes extending the wedge portion of the sled within an interior space presented by the dovetail. During such extending step, the dovetail is transitioned from a lowered position to a raised position. An additional step includes supporting the dovetail in the raised position via the wedge portion of the sled. An additional step includes retracting at least a portion of the wedge portion of the sled from within the interior space of the dovetail. During the retracting step, the dovetail is transitioned from the raised position to the lowered position. The sled further includes a friction-reducing mechanism for reducing the friction between the sled and the dovetail during the extending and retracting steps.

Embodiments of the present invention further include a system for actuating a trailer dovetail between a travel position and a load position. The system comprises a sled configured to be selectively extended and retracted with respect to the dovetail. The system additionally comprises an actuator for extending and retracting the sled. With the sled in the extended position, the actuator and the sled are configured to maintain the dovetail in the travel position without the use of secondary locking mechanisms.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 1:
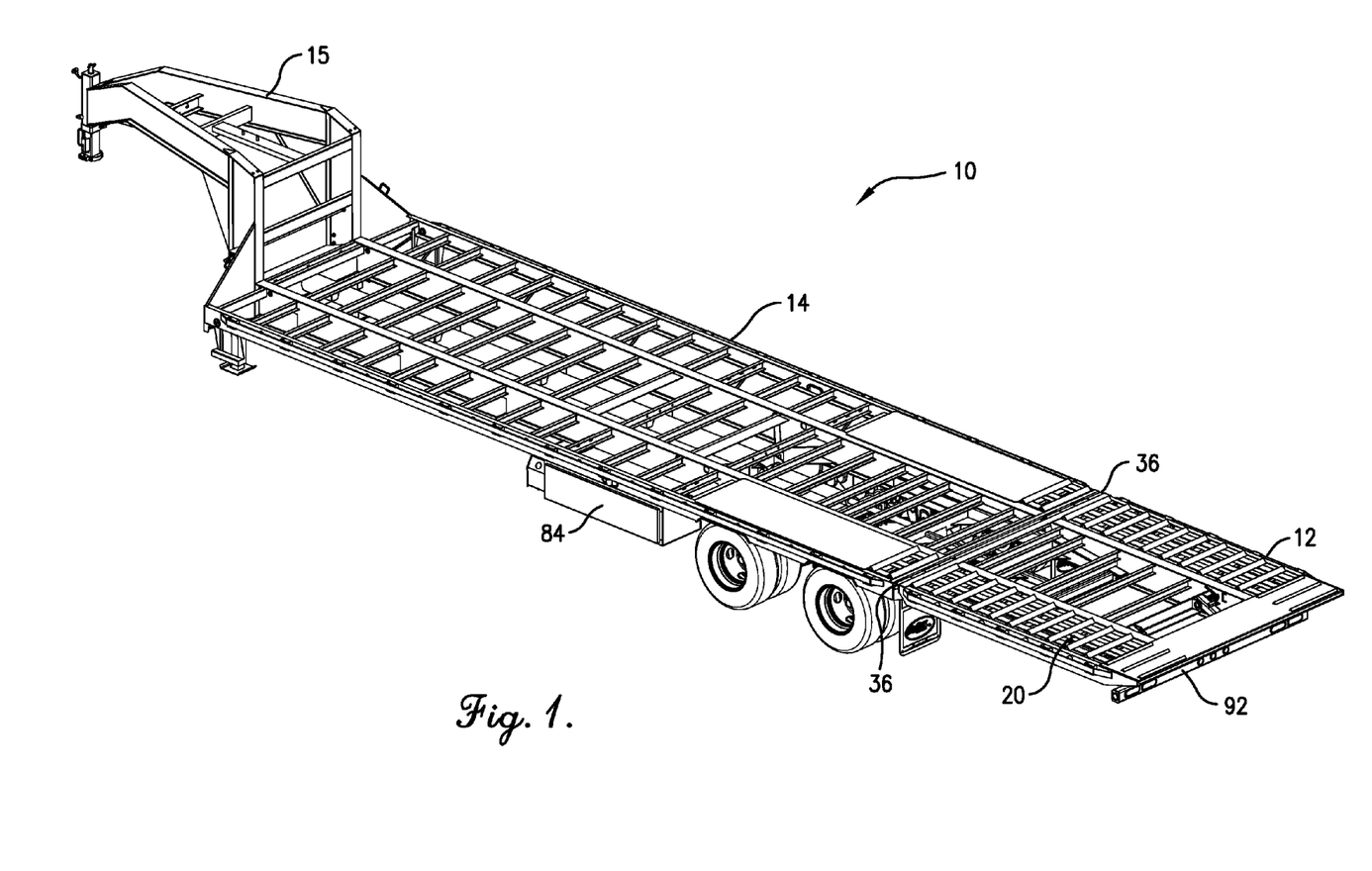
FIG. 1 is a rear perspective view of a trailer with a dovetail according to embodiments of the present invention, particularly illustrating the dovetail in a travel position.
Figure 2:
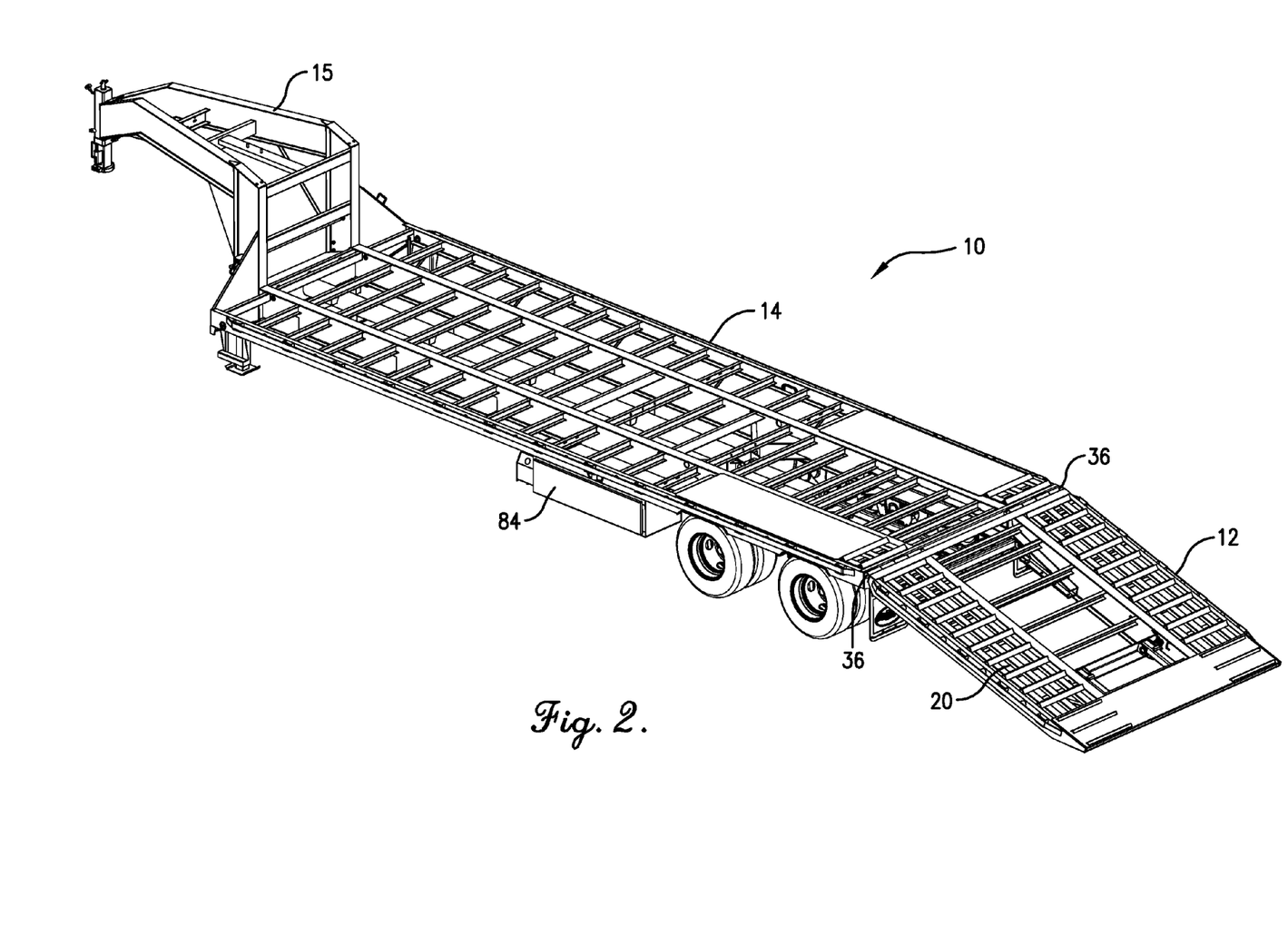
FIG. 2 is a rear perspective view of the trailer from FIG. 1, particularly illustrating the dovetail in a load position.
Figure 3:
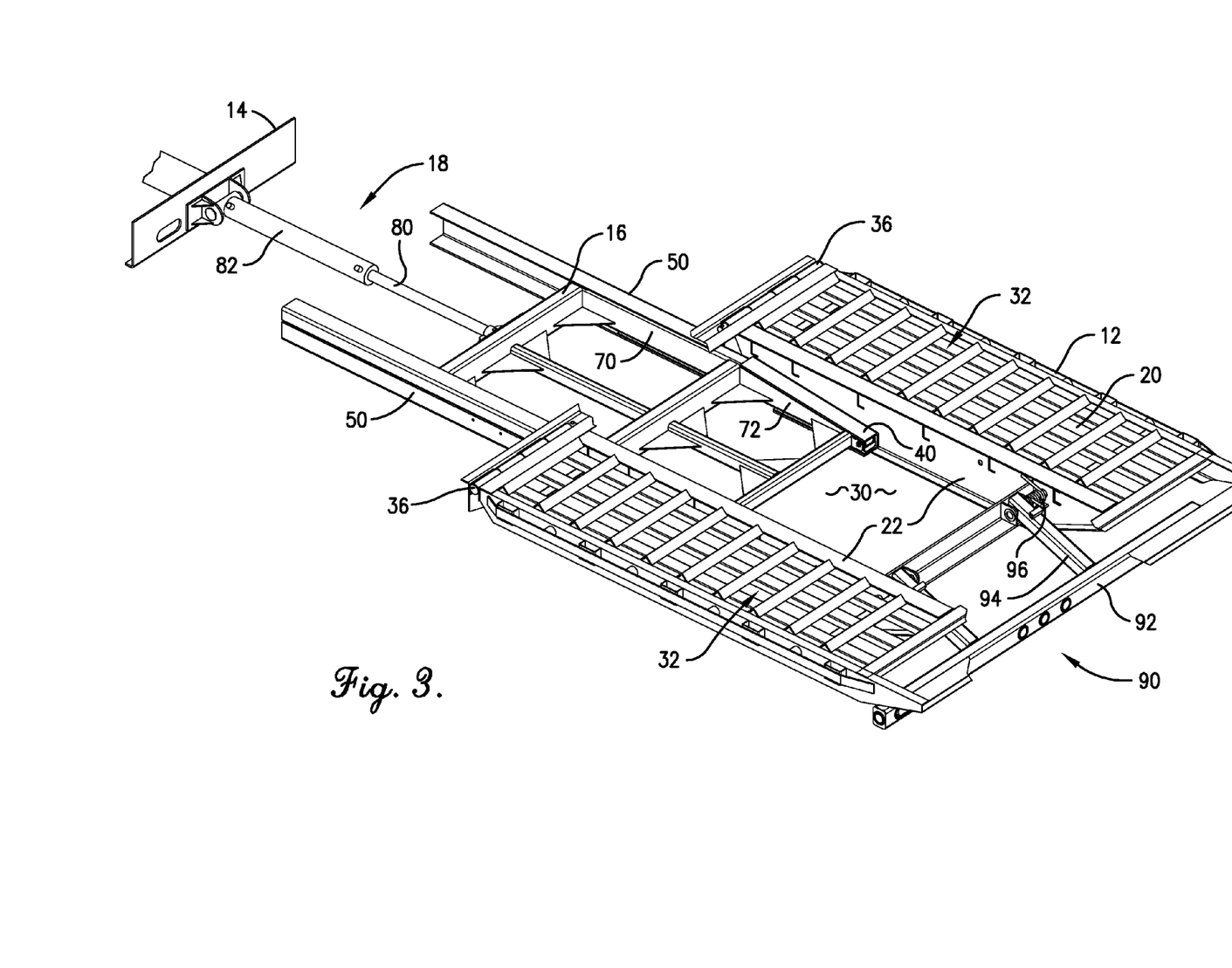
FIG. 3 is a rear partial perspective view of the trailer from FIG. 1, with a portion of the trailer cutaway to illustrate the dovetail, a sled, and an actuator, and with the dovetail in the travel position.
Figure 4:
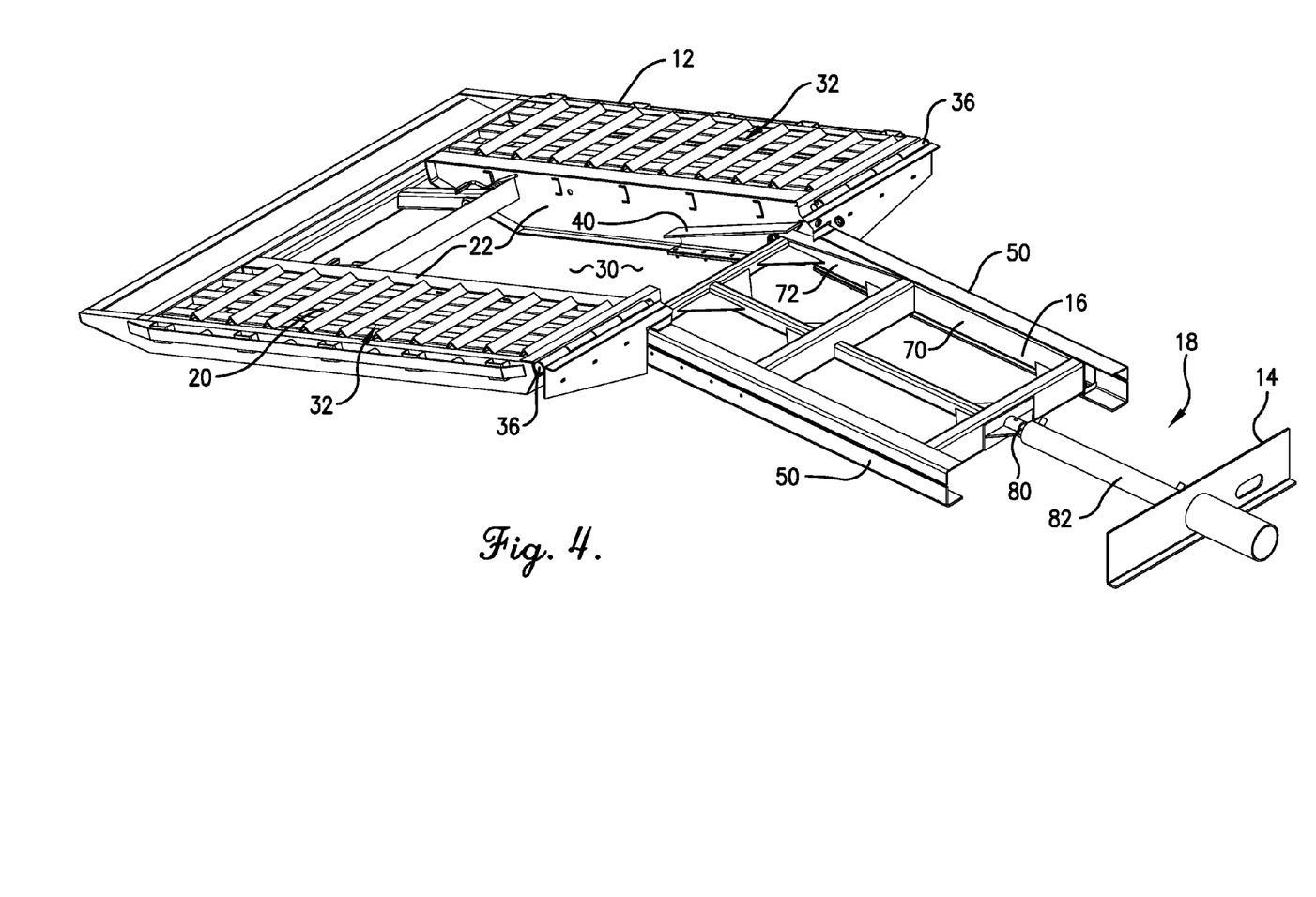
FIG. 4 is a front partial perspective view of the trailer from FIG. 2, with a portion of the trailer cutaway to illustrate the dovetail, a sled, and an actuator, and with the dovetail in the load position.

With reference to FIGS. 1 and 2, embodiments of the present invention broadly comprise a trailer dovetail system for a flatbed-type trailer 10. The trailer dovetail system includes a dovetail 12, which is positioned at a rear end of the trailer 10, and which is rotatably secured to a main portion 14 of the trailer 10. Generally, the trailer 10 will also include a hitch assembly 15 positioned at a front end of the trailer 10, with which a truck or tractor can be connected. Turning to FIGS. 3-4, the trailer dovetail system may further comprise an actuation system that includes a sled 16 configured to actuate with respect to the dovetail 12 by way of an actuator 18 secured to the main portion 14 of the trailer 10. Given the above, the dovetail system of embodiments of the present invention is configured to efficiently transition the dovetail 12 from a travel position (e.g., FIG. 1) to a load position (e.g., FIG. 2), and vice-versa. Furthermore, the dovetail system is configured to securely maintain the dovetail 12 in each of the travel position and the load position without the need for a secondary locking mechanism. As used herein, the term "front" means a direction towards the hitch 15 (and towards the truck or tractor that pulls the trailer 10), whereas the term "rear" means an opposite direction away from the hitch 15.

In more detail, and with reference to FIGS. 1-4, the dovetail 12 may broadly comprise an upper support surface 20 across which, in the load position (e.g., FIG. 2), cargo may be conveyed from the ground to the main portion 14 of the trailer 10, and vice-versa. In addition, the upper support surface 20 of the dovetail 12 may, in the travel position (e.g., FIG. 1), be configured to support at least a portion of cargo being carried by the trailer 10. As perhaps best shown by FIGS. 3-4, the dovetail 12 may comprise two spaced apart main support beams 22. The main support beams 22 may be formed from iron, steel, or other material having high strength and durability. In some embodiments, the main support beams 22 may be in the form of I-beams, tubing, channel bars, or the like. As will be described in more detail below, the space between the main support beams 22 (identified herein as interior space 30) may be sized so as to allow the sled 16 to actuate therethrough.

The upper support surface 20 of the dovetail 12 may be positioned on and/or supported by the main support beams 22. Specifically, the portion of the upper support surface 20 laterally exterior to the main support beams 22 may include a crisscrossing and/or lattice-type structure 32 of metal. Such lattice-type structure 32 may be used so as to provide support for wheels of vehicle-type cargo to drive across when loading and unloading the trailer 10. In some embodiments, a portion of the lattice-type structure 32 may have raised portions (e.g., triangular-shaped raised portions) or textured portions, so as to provide increased traction for vehicle-type cargo being loaded and unloaded from the trailer 10. The portion of the upper support surface 20 positioned over the interior space 30 may, in some embodiments, be left open (e.g., as shown in FIGS. 3-4). However, in other embodiments, metal plating or wood planks may be positioned across the portion of the upper support surface 20 positioned over the interior space 30, so as to provide additional support for the cargo being loaded, unloaded, and/or otherwise supported by the trailer 10.

To allow the dovetail 12 to transition back and forth between the travel position and the load position, the dovetail 12 may be rotatably connected to the main portion 14 of the trailer 10 via a hinge assembly 36, as illustrated in FIGS. 1-4. In some embodiments, the hinge assembly 36 may comprise female leaf elements secured to the dovetail 12 and male leaf elements with pin attached to the main portion 14, such that the pins are received through the female leaf element to allow the female leaf element (and thus the dovetail 12) to rotate about an axis extending through the pins. Nevertheless, it should be understood that other hinge configurations may be used.

Figure 5:
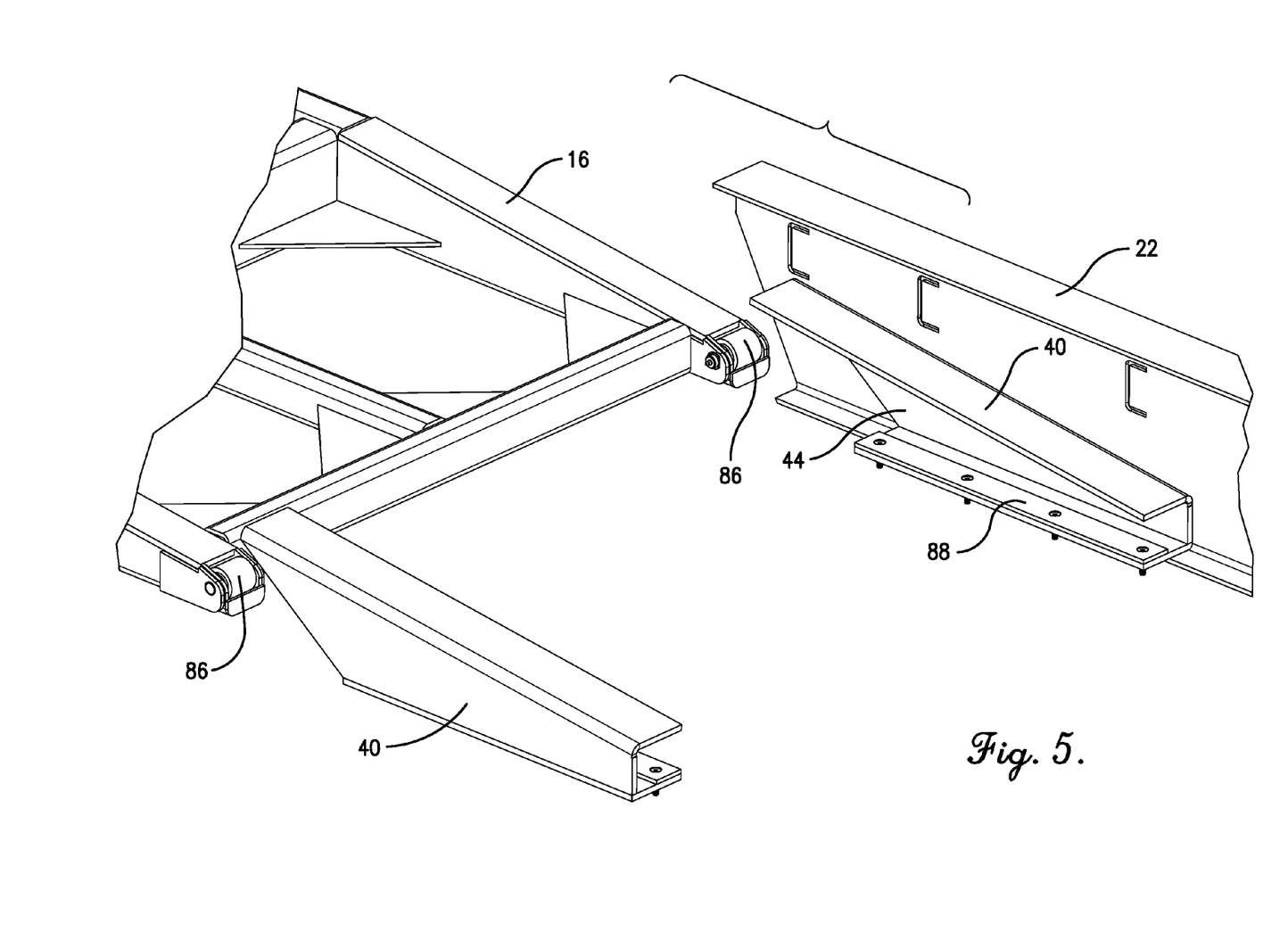
FIG. 5 is a partial perspective exploded view of the trailer from FIG. 1, with a portion of the trailer cutaway to illustrate a portion of the sled and wedge channels secured to the dovetail.
Figures 6, 7:
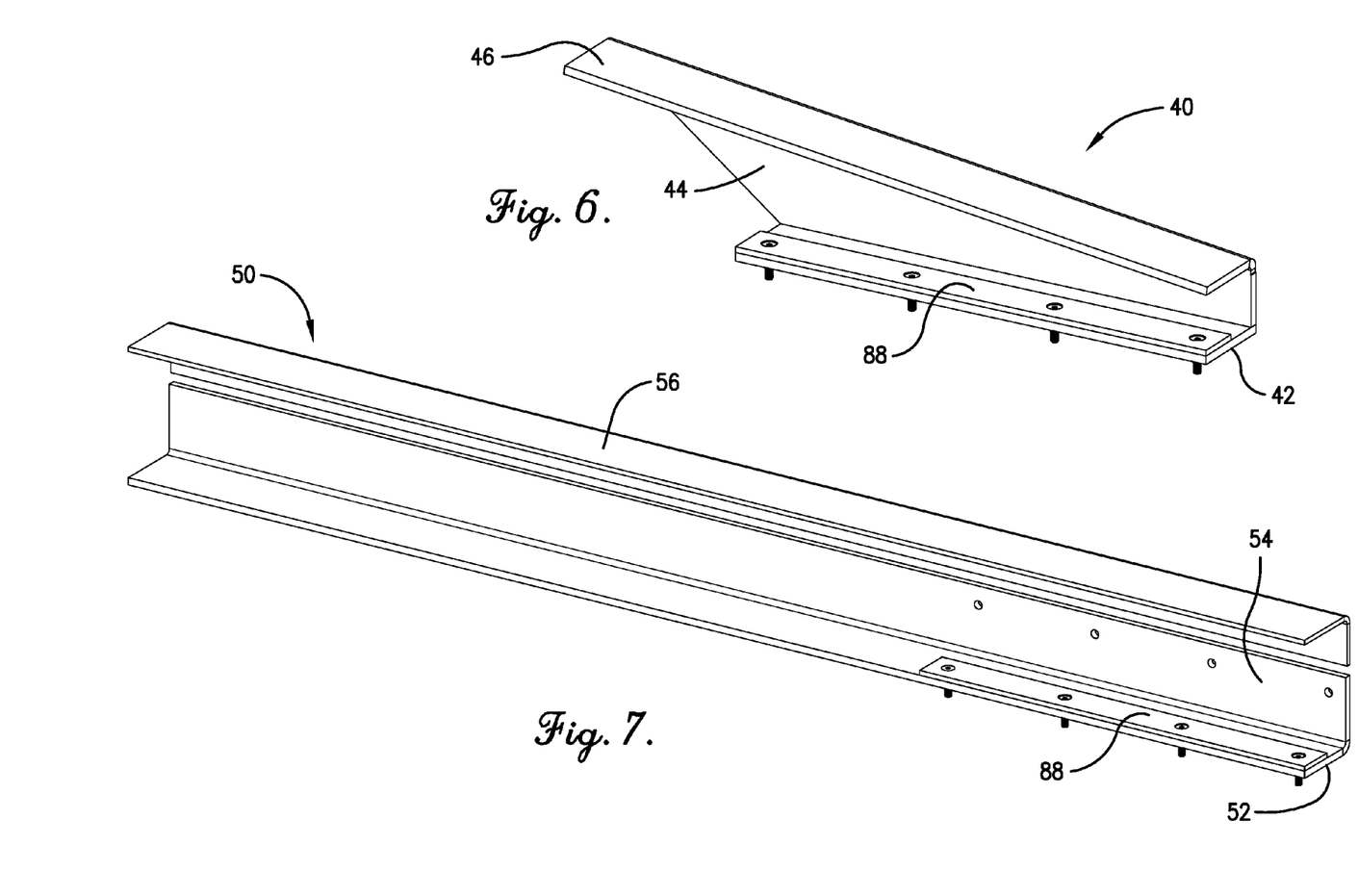
FIG. 6 is a perspective view of one of the wedge channels from FIG. 5.
FIG. 7 is a perspective view of a sled-support bar according to embodiments of the present invention.

As perhaps best illustrated by FIGS. 3-5, in certain embodiments, the dovetail 12 may include a pair of wedge-shaped channel bars 40 ("wedge channels"), with a single wedge channel 40 being secured to an interior surface of each of the main support beams 22 adjacent the front end of the dovetail 12. In some embodiments, the wedge channels 40 may be rigidly secured to the main support beams 22 via welding. However, in other embodiments, the wedge channels 40 may be rigidly secured to the main support beams 22 via nut and bolt combinations, rivets, or the like. As such, the wedge channels 40 are positioned within the interior space 30 presented between the main support beams 22 of the dovetail 12. A wedge channel 40 according to embodiments of the present invention is shown in more detail in FIG. 6. As shown in FIG. 6, each wedge channel 40 may be formed as metal channel, such as from iron or steel, with a bottom element 42, a side element 44, and a top element 46. The top element 46 may extend at an angle, such that a height of the wedge channel 40 reduces from a front end of the wedge channel 40 towards a rear end. In some embodiments, the height of the wedge channel 40 may decrease from about 7 inches at the front end of the wedge channel 40 to about 3 inches at the rear end of the wedge channel 40. A length of the wedge channels 40 may range between 10 and 50 inches, between 20 and 40 inches, or about 30 inches. A width of the wedge channels 40 may range between 1 and 5 inches, between 2 and 4 inches, or about 3.5 inches. As will be discussed in more detail below, the wedge channels 40 are configured to receive at least a portion of the sled 16. As such, the top element 46 of each wedge channel 40 may be spaced apart from the bottom element 42 by about 6 inches at the front end of the wedge channel 40 and by about 2.5 inches at the rear end of the wedge channels. Nevertheless, it should be understood that the exact dimensions of the wedge channels 40 may be modified as necessary to accommodate operation of the dovetail system, as described in more detail below. Furthermore, as illustrated in FIG. 5, the individual wedge channels 40 may be spaced apart about the interior space 30 of the dovetail 12 a sufficient distance so as to allow the sled 16 to translate therebetween.

Returning to FIGS. 3-4, in some embodiments, the dovetail system may also include a pair of spaced apart sled-support bars 50 through which the sled 16 may be actuated. The sled-support bars 50 may be formed from metal C-channels, such as iron or steel, and may be rigidly connected to an underside of the main portion 14 of the trailer 10, forward of the dovetail 12. In some embodiments, the sled-support bars 50 may be formed from two or more pieces of material that form a C-channel shape. In certain embodiments, the sled-support bars 50 may be rigidly secured to the main portion 14 of the trailer 10 via welding. However, in other embodiments, the sled-support bars 50 may be rigidly secured to the main portion 14 of the trailer 10 via nut and bolt combinations, rivets, or the like. A sled-support bar 50 according to embodiments of the present invention is shown in more detail in FIG. 7. As shown in FIG. 7, each sled-support bar 50 may be formed as metal channel, such as from iron or steel, with a bottom element 52, a side element 54, and a top element 56. As noted above, the sled-support bar 50 may, in some embodiments, be formed from two or more pieces of material, such that the side element 54 may be divided. The dimensions of the sled-support bars 50 may be configured so as to be able to receive the sled 16. For example, a height of the sled-support bars 50 may range between 6 and 8 inches, between 6.5 and 7.5 inches, or about 7 inches. A length of the sled-support bars 50 may range between 50 and 80 inches, between 60 and 70 inches, or about 68 inches. A width of the sled-support bars 50 may range between 2 and 6 inches, between 3 and 5 inches, or about 4 inches. The sled-support bars 50 are configured to receive at least a portion of the sled 16. As such, the top element 56 of each sled-support bar 50 may be spaced apart from the bottom element 52 by about 6 inches. Nevertheless, it should be understood that the exact dimensions of the sled-support bars 50 may be modified as necessary to accommodate operation of the dovetail system, as described in more detail below. Furthermore, the individual sled-support bars 50 may be spaced apart a sufficient distance so as to allow the sled 16 to translate therebetween. As such, the sled-support bars 50 are configured to act as rails to guide and support the sled 16 during its translation therethrough.

Figure 8:
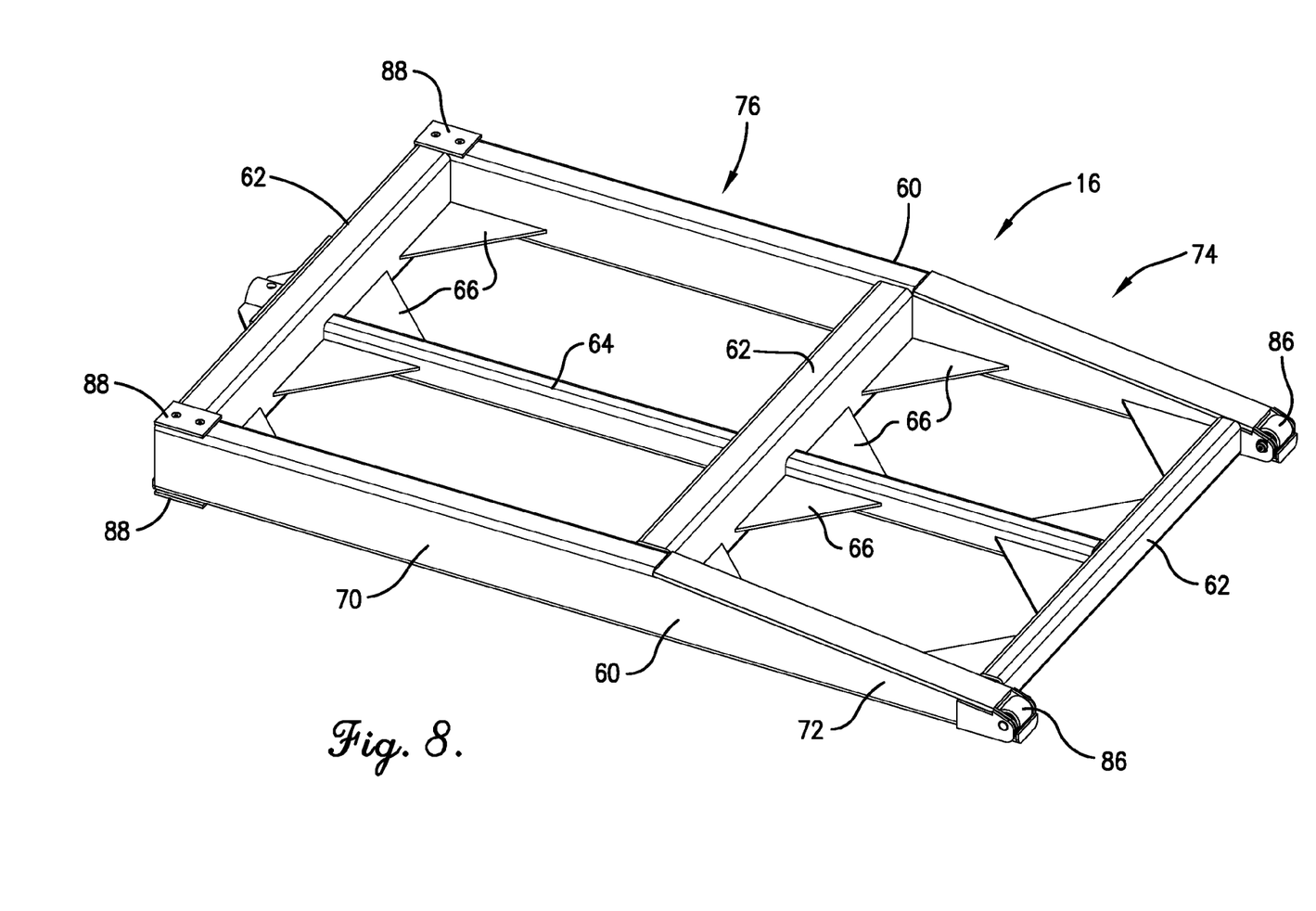
FIG. 8 is a perspective view of the sled from FIGS. 3-4.
Figure 9:
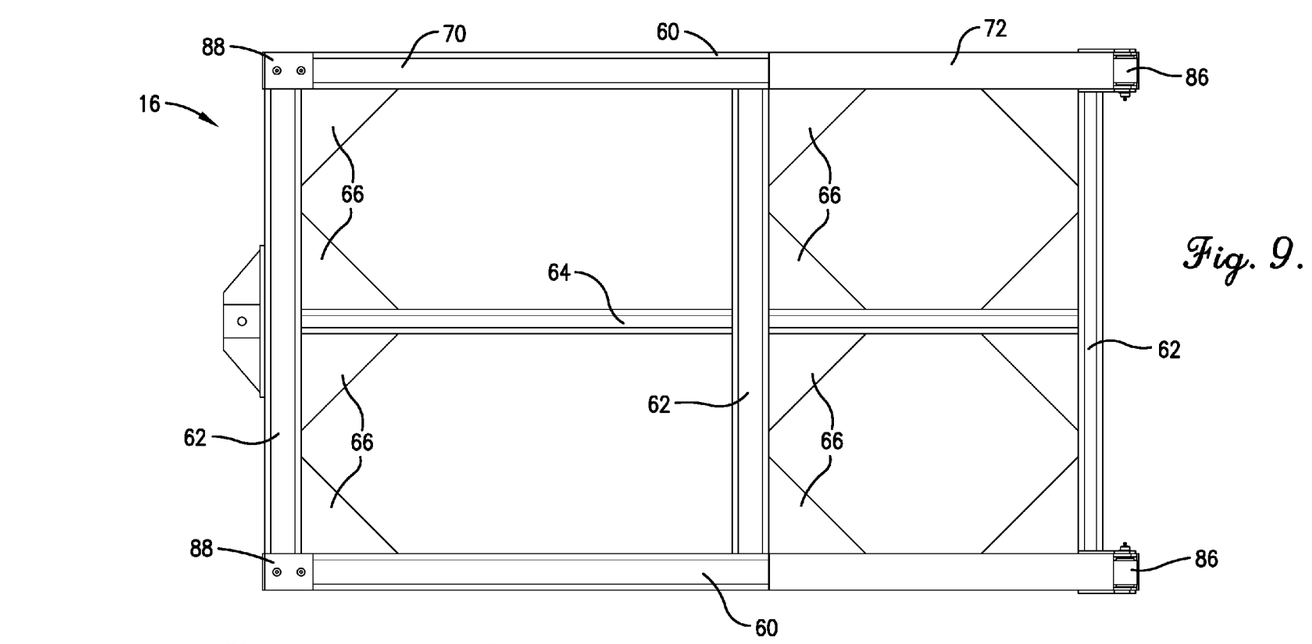
FIG. 9 is a plan view of the sled from FIGS. 3-4 and 8.
Figure 10:
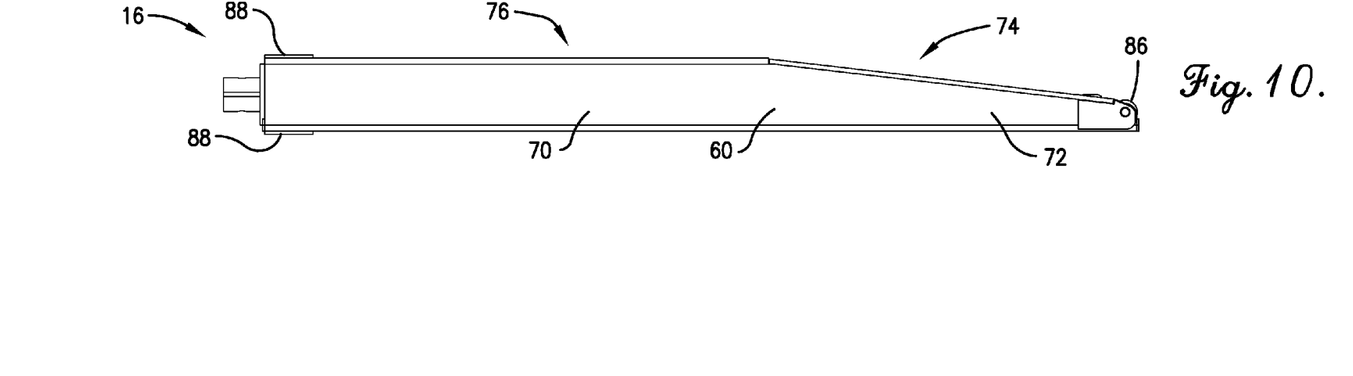
FIG. 10 is a side elevation view of the sled from FIGS. 3-4 and 8-9.

Turning to the sled 16 in more detail, and as perhaps best illustrated in FIGS. 8-10, the sled 16 may be configured in the form of a generally rectangular frame with two longitudinally-extending side support members 60. The side support members 60 may be spaced apart by a plurality of lateral support members 62 that extend between each of the side support members 60. In certain embodiments, the sled may also include a central support member 64 that extends longitudinally, generally centered between the side support members 60. In some embodiments, the central support member 64 may be continuous. In other embodiments, the central support member 64 may comprise a plurality of individual elements that extend between the lateral support members 62. As such, the sled 16 may have a length, as measured along the side support members 60, of between 50 and 90 inches, between 60 and 80 inches, or about 70 inches. The sled 16 may have a width, as measured between and including the side support members 60, of between 30 and 60 inches, between 40 and 50 inches, or about 44 inches. The components of the sled 16 may be formed from a high strength material, such as iron, steel, or the like. The interconnection between each of the components of the sled 16 (e.g., the side support members 60, lateral support members 62, and central support member 64) may be made by weld or by other types of structural fasteners, such as nut and bolt combinations, rivets, or the like. In some embodiments, gusset plates 66 may be used at the connection between components of the sled 16, so as to increase the structural integrity of the sled 16.

In more detail, the sled 16 may be include a generally planar, horizontal portion 70 and a wedge portion 72. The horizontal portion 70 may generally extend from a front end of the sled 16 to the wedge portion 72. The wedge portion 72 may generally extend from the rear end of the sled 16 to the horizontal portion 70. As shown in FIG. 10, the height of the sled 16 along the horizontal portion 70 may be generally consistent, while the height of the sled 16 decreases along the length of the wedge portion 72 from the horizontal portion 70 to the rear end of the sled 16. For instance, the height of the sled (and specifically the height of the side support members 60) may decrease from approximately 6 inches at the horizontal portion 70 to approximately 3 inches at the rear end of the sled 16 (i.e., at a free end of the wedge portion 72). In certain embodiments, such a height change will be a linear change along the length of the wedge portion 72. It should be understood that the height of the sled 16 should allow the sled 16 to be received within and translated through the sled-support bars 50. Specifically, as discussed in more detail below, the wedge portion 72 should be sized so as to fit within the wedge channels 40. Thus, the wedge-shaped profile and/or the dimensions of the wedge portion 72 should correspond with (or be at least nominally smaller than) the wedge-shaped profile and/or dimensions of the wedge channels 40. For example, a length of the wedge portion 72 of the sled 16, as measured along the side support members 60, may be between 10 and 50 inches, between 20 and 40 inches, or about 30 inches (i.e., generally equivalent with the length of the wedge channels 40). Similarly, with the wedge portion 72 of the sled 16 received in the wedge channels 40, the height of the wedge portion 72, as measured about its length, should correspond with (or at least be nominally less than) the distance between the bottom element 42 and the top element 46 of the wedge channel, as measured about its length.

As shown in FIGS. 8 and 10, due to the decreasing height of the side support members 60 along the wedge portion 72, the upper surface of the sled 16 along the wedge portion 72 is presented in the form of an incline. As such, the upper surfaces of the sled 16 along the side support members 60 about the wedge portion 72 are hereinafter collectively referred to as the "incline surface" 74 of the sled. Contrastingly, the upper surfaces of the sled 16 along the side support members 60 about the horizontal portion 70 are generally horizontal and are hereinafter collectively referred to as the "horizontal support surface" 76 In some embodiments, the lateral support members 62 may also form part of the incline surface 74 or the horizontal support surface 76.

Turning to the actuator 18 in more detail, as shown in FIG. 3-4, the actuator may comprise various types of actuators capable of actuating (e.g., extending and retracting) the sled 16. Specifically, the actuator 18 should be configured to actuate at least a portion of the sled 16 into and out of the interior space 30 (and within and between the wedge channels 40) of the dovetail 12. For instance, as shown in FIGS. 3-4, the actuator 18 may comprise a hydraulic system that includes a piston 80 that is configured to extend from and retract within a cylinder barrel 82 by applying and removing hydraulic fluid to/from the cylinder barrel 82. In such a manner, the hydraulic system can actuate the sled 16. Specifically, the base of the cylinder barrel 82 may be secured to an underside of the main portion 14 of the trailer 10. In addition, a free end of the piston 80 may be secured to the forward end of the sled 16. As such, the hydraulic system can actuate the sled 16 rearward and forward (i.e., in and out of the dovetail's 12 interior space 30 and/or between the wedge channels 40). In other embodiments, the actuator 18 may alternatively comprise an electric linear actuator, a chain drive system, a wire and pulley system, or the like. The actuator 18 may be controlled by hydraulic control mechanisms, by electronic control mechanisms, or the like. Such control mechanisms may be stored for instance, in control box 84, illustrated in FIGS. 1-2 on the side of the main portion 14 of the trailer 10. For instance, in embodiments in which the actuator 18 is a hydraulic system, a hydraulic fluid reservoir, a hydraulic pump, and associated controls may all be housed within the control box 84. In addition, in some embodiments, the control box 84 may house an independent deep-charge battery for providing power to the hydraulic pump. In some embodiments, the trailer 10 may include components that allow the deep-charge battery to be recharged by the electrical system of the vehicle pulling the trailer 10. In some embodiments, the actuator 18 may be controlled by a handheld remote control electrically coupled with the control mechanisms. In some embodiments, the handheld remote control may be wireless. Such controls may be store in the control box 84 as well.

As will be described in more detail below, actuation of the sled 16 will provide for the dovetail 12 to be transitioned between travel and load positions. Specifically, the sled 16 is configured to actuate back and forth between a position where it is generally situated between the sled-support bars 50 and a position where at least a portion of the sled 16 is situated inside the interior space 30 of the dovetail 12 and/or within and between the wedge channels 40. In more detail, the sled 16 may initially be retracted from the dovetail 12, such that the sled 16 is generally received between the sled-support bars 50. In such a position, less than a substantial portion of the sled 16 is received inside the interior space 30 of the dovetail 12 and/or within and between the wedge channels 40. As used herein, the term "substantial portion" may mean 15 percent, 20 percent, 25 percent, 30 percent, 35 percent, or 40 percent of the length of the sled 16. With the sled 16 in such as position, the dovetail 12 is configured in the load position, as illustrated in FIGS. 2 and 4 (i.e., lowered with its free, rear end resting on the ground). As such, with the dovetail 12 in the load position, cargo can be loaded onto the main portion 14 of the trailer 10. It should be understood that although less than a substantial portion of the sled 16 is received within and between the wedge channels 40 when the dovetail 12 is in the load position, certain embodiments may provide for at least a nominal portion of the sled 16 to still be received within and between the wedge channels 40 (and, thus, within the interior space 30).

From such a position, the sled 16 can be extended, via force of the actuator 18, through the sled-support bars 50 to a position in which at least a substantial portion of the sled 16 is received within the interior space 30 of the dovetail 12 and, thus, received within and between the wedge channels 40. It is noted that as the sled 16 translates, the sled-support bars 50 are configured to act as rails that guide the sled 16 towards the interior space 30 of the dovetail 12. During such translation, the upper surface of the sled 16 (e.g., the incline surface 74) will come into contact with an interior surface of the top element 46 of each of the wedge channels 40, such that dovetail 12 will be forced to rotate upward about the hinge assembly 36. As such, when at least a substantial portion of the sled 16 is received within the interior space 30 and/or within and between the wedge channels 40, the dovetail 12 may be configured in the travel position, as illustrated in FIGS. 1 and 3 (i.e., raised and coplanar with the main portion 14 of the trailer 10). With the dovetail 12 in the travel position, the trailer 10 and its cargo can be transported.

Figure 11:
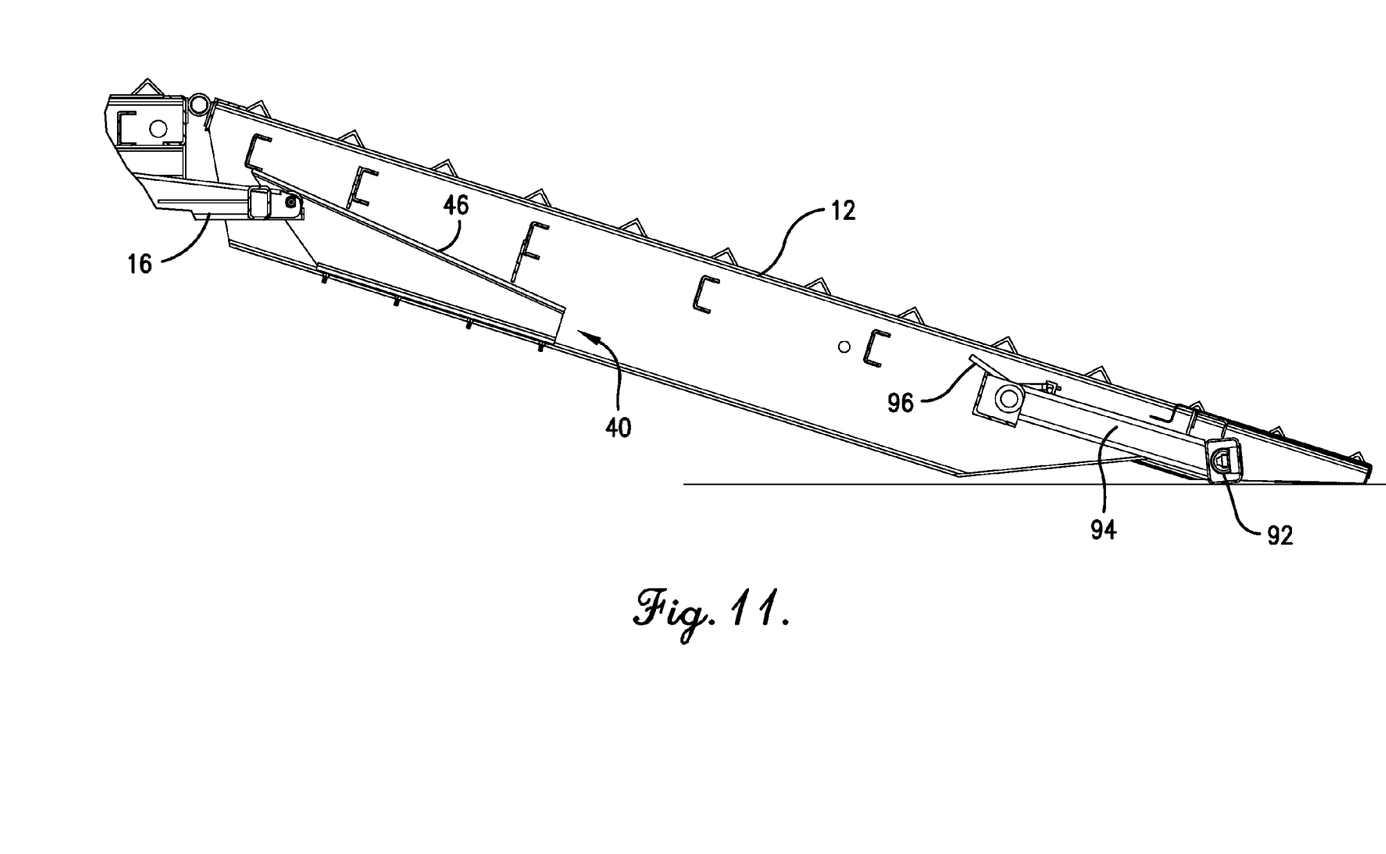
FIG. 11 is a partial cross-section of the trailer from FIGS. 1-2, particularly illustrating the dovetail in a load position.
Figure 12:
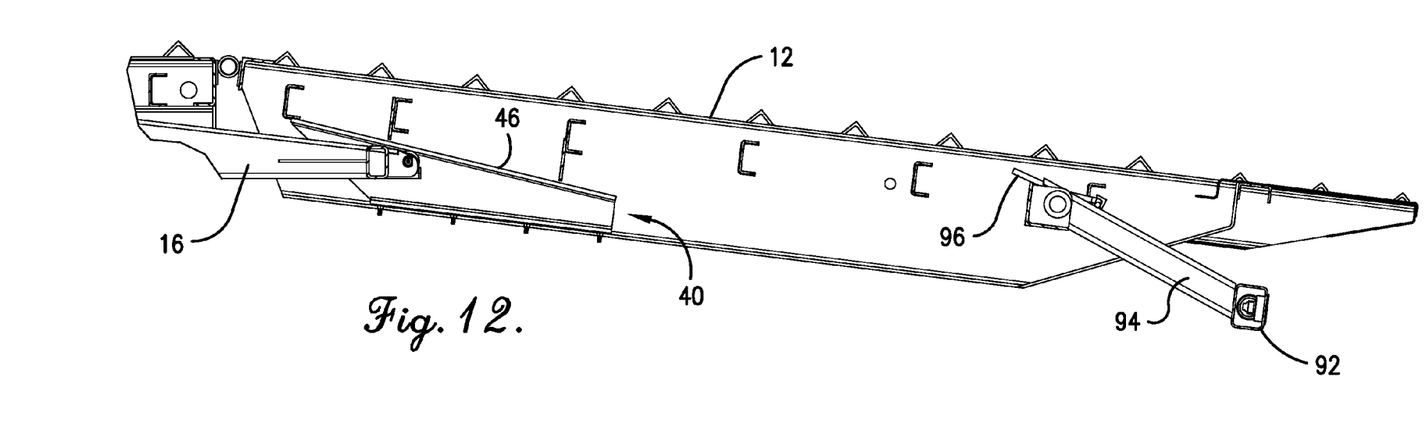
FIG. 12 is partial cross-section of the trailer from FIGS. 1-2, particularly illustrating the dovetail in transition between a load position and a travel position.
Figure 13:
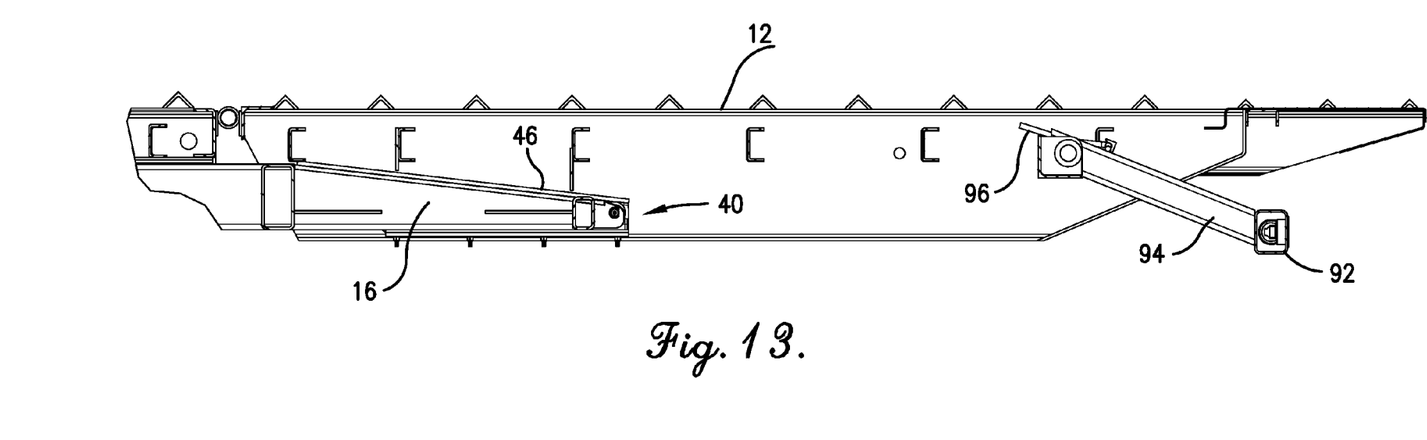
FIG. 13 is a partial cross-section of the trailer from FIGS. 1-2, particularly illustrating the dovetail in a travel position.

FIGS. 11-13 broadly summarize the transition of the dovetail 12 between load and travel positions. FIG. 11 illustrates the dovetail 12 in the load position, with less than a substantial portion of the sled 16 received within and between the wedge channels 40. From such a position, the sled 16 can be actuated forward to contact the interior surface of the top element 46 of each of the wedge channels 40 near the wedge channels' 40 front ends. As the sled 16 continues to extend, as shown in FIG. 12, the upper surface of the sled 16 (e.g., the incline surface 74) will slide along the interior surface of the top element 46 of each of the wedge channels 40, so as to force the dovetail 12 to rotate upward. Such upward rotation will continue during the extension of the sled 16 until the rear end of the sled 16 reaches the rear end of the wedge channel 40, as shown in FIG. 13. At such point, the dovetail 12 will be completely raised to the travel position (i.e., FIG. 1, generally horizontal and coplanar with the main portion 14 of the trailer 10). Thus, as described above, the sled 16 is configured to actuate the dovetail 12 from the load position to the travel position. Alternatively, by performing a reverse operation (i.e., retracting the sled 16 from within interior space 30 and from between the wedge channels 40) the dovetail 12 will rotate downward from the travel position (e.g., FIGS. 1 and 13) to the load position (e.g., FIGS. 2 and 11) under the force of gravity.

The operation of the dovetail system will now be described in further detail, beginning with the dovetail 12 in the travel position as shown in FIGS. 1, 3, and 13. As illustrated, with the dovetail 12 in the travel position, the dovetail 12 is generally coplanar with the main portion 14 of the trailer 10. The dovetail 12 is supported in such a travel position by having the wedge portion 72 of the sled 16 extended within the interior space 30 of the dovetail 12 (See FIGS. 3 and 13). Specifically, in the travel position, the wedge portion 72 of the sled 16 may be completely received within and between the wedge channels 40 of the dovetail 12. As previously noted, the size and shape of the wedge portion 72 of the sled 16 may be configured to correspond to the size and shape of the wedge channels 40, such that the wedge portion 72 of the sled 16 can be completely received within and between the wedge channels 40. As such, with the wedge portion 72 of the sled 16 completely received within and between the wedge channels 40, such the entire weight of the dovetail 12 can be supported by the wedge portion 72 of the sled 16. It should be understood, however, that while the wedge portion 72 of the sled 16 is received within the wedge channels 40 of the dovetail 12, the horizontal portion 70 of the sled 16 remains within the sled-support bars 50, which are rigidly secured to the main portion 14 of the trailer 10. As such, the sled 16 is configured distribute the weight of the dovetail 12 through the sled-support bars 50 and to the main portion 14 of the trailer 10.

To load cargo up onto the main portion 14 of the trailer 10, the dovetail 12 is transitioned to the load position, as shown in FIGS. 2, 4, and 11, with the dovetail 12 angled downward and having its rear end resting on or adjacent to the ground. To effect such a transition, the actuator 18 begins to retract the sled 16 from within the interior space 30 of the dovetail 12, and specifically, it retracts at least a portion of the wedge portion 72 of the sled 16 from the wedge channels 40 of the dovetail 12. As the sled 16 is retracted, the wedge portion 72 of the sled 16 is progressively slid out from the wedge channels 40 of the dovetail 12. Because the height of the wedge portion 72 of the sled 16 increases from the rear end of the sled 16 and because the height of the wedge channels 40 increase from the rear end of the wedge channels 40, as the wedge portion 72 of the sled 16 is retracted, the incline surface 74 of the sled 16 will slide along the interior surfaces of the top elements 46 of the wedge channels 40 (See, e.g., FIG. 12), thus, allowing the dovetail 12 to begin to drop downward under the force of gravity. Specifically, the dovetail 12 will begin to rotate downward about the hinge assembly 36. Once less than a substantial portion of the sled 12 remains within the interior space 30 of the dovetail 12 and, thus, within and between the wedge channels 40 (See, e.g., FIG. 11), the dovetail 12 will be completely rotated downward about the hinge assembly 36 such that the rear end of the dovetail 12 is adjacent to or touches the ground. With the sled 16 retracted from the interior space 30 of the dovetail, most of the sled 16 will be retained between within the sled-support bars 50, as shown in FIG. 4. In such an orientation, the trailer 10 is in the load position, such that cargo (e.g., a vehicle) can be loaded from the ground, up the dovetail 12, and onto the main portion 14 of the trailer 10.

Thereafter, to transition the dovetail 12 from the load position back to the travel position, the actuator 18 can extend the sled from between the sled-support bars 50 until at least a substantial portion of the sled 16 is received within the interior space 30 of the dovetail 12 and/or within and between the wedge channels 40. Specifically, the wedge portion 72 of the sled 16 will be inserted within and between the wedge channels 40 of the dovetail 12. As such, the incline surface 74 of the sled 16 will begin to make contact with the interior surface of the top elements 46 of the wedge channels 40 on the dovetail 12, such that the dovetail 12 will be forced upward, i.e., rotated upward about the hinge assembly 36, with the rear end of the dovetail 12 being lifted up and away from the ground. As the sled 16 is extended within the interior space 30 and/or within and between the wedge channels 40 of the dovetail 12, the dovetail 12 will continue to rotate upward. The dovetail 12 will continue such upward rotation until the sled 16 is sufficiently extended within the interior space 30 of the dovetail 12. Specifically, dovetail 12 may rotate upwards until the wedge portion 72 of the sled 16 is completely extended within and between the wedge channels 40 of the dovetail 12. At such time, the dovetail 12 will be in a generally horizontal position that is coplanar with the main portion 14 of the trailer 10 (i.e., the dovetail 12 will be in the travel position). In the travel position, the trailer 10 (and any cargo supported thereon) can be transported.

Beneficially, the present invention allows the dovetail 12 to be maintained in the travel position without the need for secondary locking mechanisms to support the dovetail 12 in such a generally horizontal orientation. Specifically, the sled 16 may be held in place within the interior space 30 and/or within and between the wedge channels 40 of the dovetail 12 by the actuator 18. As such, the actuator 18 will act as a securement mechanism, which prevents the sled 16 from being inadvertently retracted and prevents the dovetail 12 from any unwanted movement. For instance, in the case of the actuator 18 being a hydraulic system, the hydraulic piston 80 that is attached to and that actuates the sled 16 will be held securely in place in the extended position by the force of the hydraulic fluid within the cylinder barrel 82. As such, the dovetail 12 can be maintained in the horizontal orientation of the trailer's travel position without the need of mechanical locks, latches, or other types of secondary locking mechanisms.

Embodiments of the present invention also beneficially comprise components that facilitate the ability of the sled 16 to be extended and retracted with respect to the dovetail 12 in a reduced frictional manner. For instance, as shown below in FIGS. 8-10, the sled 16 can include one or more friction reducing mechanism, such as roller assemblies 86 and/or runner assemblies 88. In more detail, the sled 16 may include two roller assemblies 86 positioned on the rear end of the sled 16. Specifically, each of the side support members 60 may include a roller assembly 86 mounted thereon, with each roller assembly 86 including a roller rotatably mounted within the rear end of the side support member via an axle pin.

The roller assemblies 86 allow the sled 16 to be extended and retracted from within the wedge channels 40 of the dovetail 12 in an efficient and reduced-frictional manner. Specifically, as shown in FIGS. 11-13 the rollers of the roller assemblies 86 can be configured to contact the interior surfaces of the top elements 46 of the wedge channels 40 of the dovetail 12 as the sled 16 is extended and retracted therefrom. As such, the rollers will reduce the amount of friction experienced between the sled 16 and the dovetail 12 during the sled's 16 extension and retraction. In certain other embodiments, the sled 16 may include roller assemblies 86 located at other positions on the sled 16. For instance, the sled 16 may include roller assemblies 86 located on the upper surfaces of the side support members 60 adjacent to the front end of the sled 16. In such configurations, the rollers on the front end of the sled 16 may facilitate the ability of the sled 16 to actuate within the sled-support bars 50 in an efficient, reduced-frictional manner.

In addition to the roller assemblies 86, the sled 16 may include one or more runner assemblies 88 positioned on various locations about the sled 16. The runner assemblies 88 may be made from a high-impact plastic material that has a low frictional coefficient. For instance, the runner assemblies 88 may be made from high-impact polystyrene. The runner assemblies 88 may be secured to the sled 16 by various methods of attachment, such as fasteners, adhesives, weld, or the like. In some embodiments, the sled 16 may include runner assemblies positioned near the front end of the sled 16. Specifically, as shown in FIGS. 8-10, the sled 16 may include a runner assembly 88 positioned on the upper surface and lower surface of each of the side support members 60. In other embodiments, the sled 16 may include runner assemblies 88 on exterior-facing surfaces of each of the side support members 60 as well. As such, the runner assemblies 88 may contact/impact the sled-support bars 50 during extension and retraction of the sled 16. Because of the low frictional coefficient of the runner assemblies 88, such runner assemblies can be used reduce the amount of friction experienced by the sled 16 during translation through the sled-support bars 50. Such runner assemblies 88 may also increase the durability of the sled 16 and the sled-support bars 50, so as to reduce wear and tear on the dovetail system. Embodiments of the present invention may provide for the runner assemblies 88 to be positioned at other locations on the sled 16, as may be required to reduce the friction experienced by the sled 16 and to increase durability of the dovetail system. Furthermore, other components of the dovetail system may include runner assemblies 88. For instance, as illustrated in FIGS. 6 and 7, interior surfaces of bottom elements 42 and 52 of the wedge channels 40 and sled-support bars 50, respectively, may also have runner assemblies 88 attached thereto, so as to further reduce the friction experienced between the sled 16 and the wedge channels 40 or sled-support bars 50.

In addition to the features described above, the dovetail system may include components that increase the safety of the trailer 10. For example, as illustrated in FIG. 3, the dovetail 12 may include a collapsible bumper assembly 90. The collapsible bumper assembly 90 may include an elongated bumper 92 that extends about generally the entire width of the dovetail 12. The bumper 92 may be hingedly connected to an underside of the dovetail 12 via a pair of support arms 94. The bumper 92 may be biased in a deployed position, as shown in FIGS. 1 and 3, via biasing springs 96 positioned near connection locations of the support arms 94 and the dovetail 12. In the deployed position, the bumper 92 extends down below the dovetail 12, such that the bumper is easily visible from behind the trailer 10. The bumper 92 may include light elements, reflectors, or other components that increase visibility of the trailer 10 from a position behind the trailer 10. However, because the bumper 92 extends below the underside of the dovetail 12, the bumper 92 could potentially interfere with the dovetail's 12 actuation from the travel position to the load position. Nevertheless, to alleviate such issues, the bumper assembly 90 is configured to be collapsible.

In more detail, with reference to FIG. 13, with the dovetail 12 in the travel position, the biasing springs 96 bias the bumper 92 downwards into a deployed position, such that the bumper 92 is easily visible from behind the trailer 10. Contrastingly, as the dovetail 12 is lowered to the load position, the bumper 92 contacts the ground and is forced upward against the force of the biasing spring 96. The bumper 92 is continually forced upward until it is positioned in a collapsed position against the underside of the dovetail, as shown in FIG. 11. As such, the rear end of the dovetail 12 can contact the ground without interference from the bumper assembly 90. Thereafter, the dovetail 12 can be raised to the travel position. Once the dovetail 12 begins to rise, the biasing spring 96 will force the bumper 92 from the collapsed position to the deployed position, where it is easily visible from behind the trailer 10.

As should be understood, the dovetail system and method of use, as described above, prevents unwanted movement of the dovetail 12 when the trailer 10 is in transit. For instance, unwanted movement may occur in a common trailer equipped with a dovetail due to a heavy load, a collision, rough terrain, or the weight of the dovetail itself against its support pins or support brackets. However, the actuator 18 of the present invention, such as in the form of hydraulic system, can be used to maintain the sled 16 in place within the interior space 30 of the dovetail 12. As such, the dovetail 12 will be securely supported by the sled 16 during transport. Additionally, the dovetail system and method of use described herein will reduce damage to the trailer 10 due to human error by preventing movement of the dovetail 12 when an operator attempts to actuate the dovetail 12 while the sled 16 is still in the locked position, particularly because there is no need for a secondary locking mechanism to secure the sled 16 in place. Furthermore, the dovetail system and method of use, as described above, allow operation of the trailer 10 in a reduced-frictional manner that improves efficiency and reduces wear and tear on the trailer 10 components. Furthermore still, the dovetail system and method of use, as described above, increases the functionality and safety of the trailer 10 by providing a collapsible bumper 90 increases visibility of the trailer 10 but does not interfere with the dovetail's 12 actuation from the travel position to the load position.

Although the invention has been described with reference to the embodiments illustrated in the attached drawing figures, it is noted that equivalents may be employed and substitutions made herein without departing from the scope of the invention as recited in the claims.

The invention claimed is:

1. A trailer comprising:
    a main portion supported by at least one rear wheel;
    a dovetail connected to a rear end of said main portion and configured to actuate between a travel position and a load position;
    a sled secured to said main portion and configured to actuate between a retracted position and an extended position;
    an actuator for extending and retracting said sled;
    at least one a wedge-shaped channel comprising a bottom element and a top element, wherein said wedge-shaped channel is connected to said dovetail and configured to receive at least a portion of said sled between said bottom element and said top element when said sled is in the extended position,
    wherein actuation of said sled is configured to actuate said dovetail between the travel position and the load position, wherein said rear wheel remains forward of said dovetail when said dovetail is in both the travel position and the load position,
    wherein with said sled in the extended position, said actuator and said sled are configured to maintain said dovetail in the travel position without the use of secondary locking mechanisms.

2. The trailer of claim 1, wherein said dovetail is rotatably connected to said main portion via a hinge assembly.

3. The trailer of claim 1, wherein said sled comprises a generally rectangular frame that includes a horizontal portion and a wedge portion.

4. The trailer of claim 1, wherein a height of said wedge portion of said sled varies from about 7 inches at a point adjacent to said horizontal portion to about 3 inches at a free end of said wedge portion.

5. The trailer of claim 1, wherein said sled includes one or more roller assemblies, wherein said roller assemblies comprise a roller rotatably mounted to said sled.

6. The trailer of claim 1, wherein said sled includes one or more runner assemblies mounted to said sled, wherein said runner assemblies comprise a material having a high-impact strength and/or low coefficient of friction.

7. The trailer of claim 6, wherein said runner assemblies comprise a high-impact plastic.

8. The trailer of claim 3, wherein said dovetail comprises spaced apart support beams that present an interior space therebetween, wherein said sled is configured to be extended and retracted with respect to said interior space.

9. The trailer of claim 8, wherein said wedge-shaped channel is secured to the interior surface of one of said support beams, wherein said trailer includes another wedge-shaped channel secured to the other one of said support beams, with the wedge-shaped channels positioned within the interior space presented by the dovetail.

10. The trailer of claim 9, wherein each of said wedge-shaped channels includes a height that reduces from about 7 inches at a maximum to about 3 inches at a minimum.

11. The trailer of claim 9, wherein with said dovetail in the travel position, said wedge portion of said sled is received between said wedge-shaped channels, and wherein with said dovetail in the load position, less than a substantial portion of said wedge portion of said sled is received between said wedge-shaped channels.

12. The trailer of claim 1, wherein said trailer includes a pair of spaced apart sled-support bars secured to an underside of said main portion, wherein said sled-support bars are configured to support said sled during extension and retraction.

13. The trailer of claim 1, wherein said actuator comprises a hydraulic system that includes a piston and a cylinder barrel.

14. The trailer of claim 1, wherein said actuator is remotely controlled.

15. The trailer of claim 1, wherein said trailer includes a collapsible bumper configured to be deployed when said dovetail is in the travel position and configured to be collapsed when said dovetail is in the load position.

16. A method of raising and lowering a trailer dovetail for a trailer, wherein the trailer is supported by at least one rear wheel, the method comprising the steps of:
(a) providing a sled that includes a wedge portion;
(b) extending the wedge portion of the sled within a wedge-shaped channel secured to the dovetail, wherein during said extending of step (b) the dovetail is transitioned from a lowered position to a raised position;
(c) supporting the dovetail in the raised position via the wedge portion of the sled;
(d) retracting at least a portion of the wedge portion of the sled from within the wedge-shaped channel, wherein during said retracting of step (d) the dovetail is transitioned from the raised position to the lowered position,
wherein the sled further includes a friction-reducing mechanism for reducing the friction between the sled and the dovetail during said extending and retracting of steps (b) and (d),
wherein said rear wheel remains forward of said dovetail when said dovetail is in both the raised position and the lowered position.

17. The method of claim 16, wherein the friction-reducing mechanism comprises a high-impact plastic.

18. The method of claim 16, wherein said extending and retracting of steps (b) and (d) are performed by a hydraulic system.

19. The method of claim 18, wherein the hydraulic system is configured to maintain the dovetail in the raised position without the use of a secondary locking mechanism.

20. A system for actuating a trailer dovetail between a travel position and a load position, said system comprising:
a sled configured to be selectively extended and retracted with respect to the dovetail;
an actuator for extending and retracting said sled; and
a pair of spaced apart wedge-shaped channels, each comprising a bottom element and a top element, wherein said wedge-shaped channels are configured to receive at least a portion of said sled in an extended position,
wherein actuation of said sled is configured to actuate the dovetail between the travel position and the load position,
wherein with said sled in the extended position, said actuator and said sled are configured to maintain the dovetail in the travel position without the use of secondary locking mechanisms.

* * * * *